I. B. DUNCAN.
COMBINED SHAFT SUPPORT AND THILL COUPLING.
APPLICATION FILED DEC. 16, 1911.
1,039,711.
Patented Oct. 1, 1912.
2 SHEETS—SHEET 1.
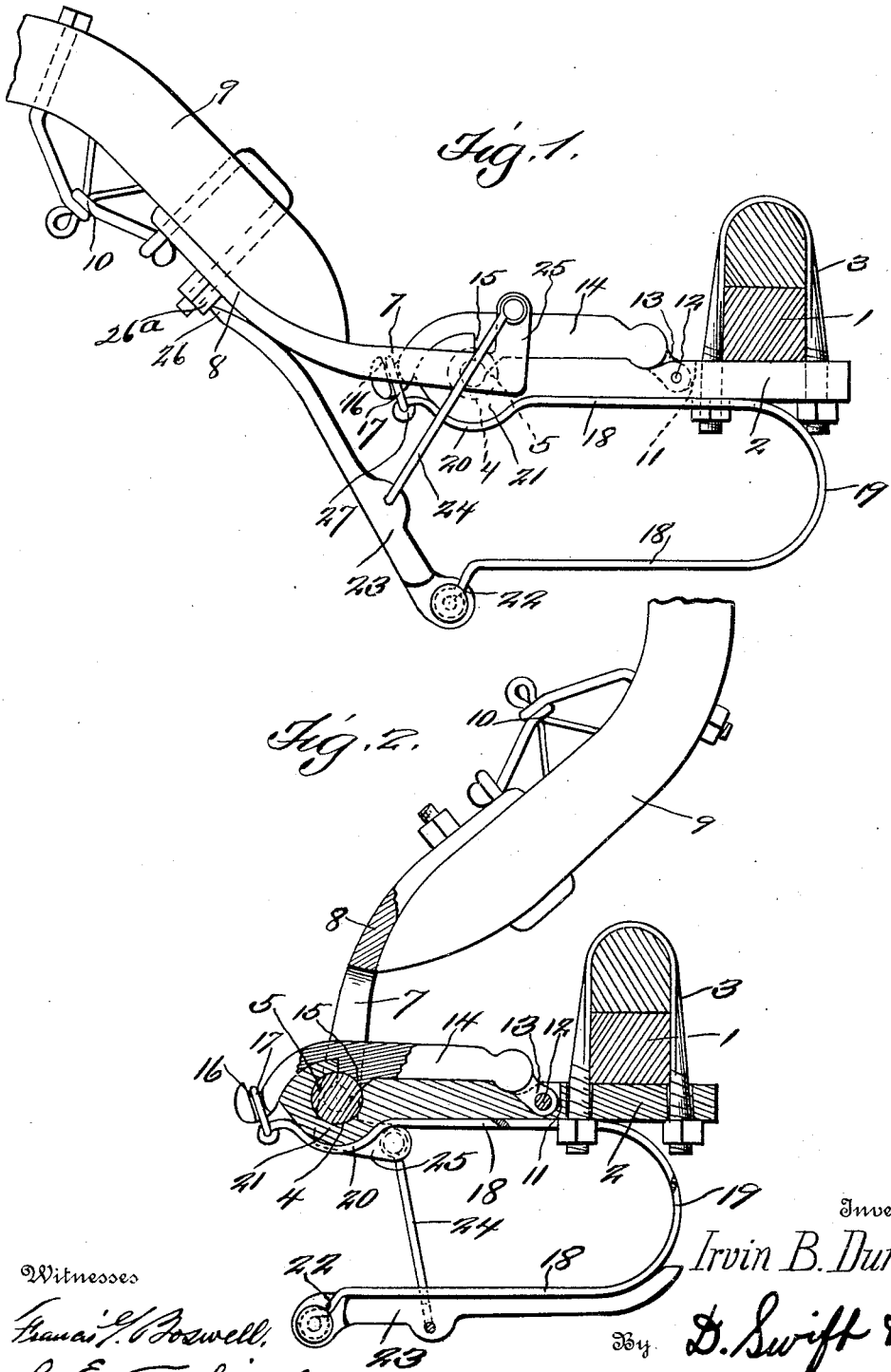
Witnesses
Francis L. Boswell
C. E. Frothingham
Inventor
Irvin B. Duncan,
By D. Swift & Co.
Attorney I. B. DUNCAN.
COMBINED SHAFT SUPPORT AND THILL COUPLING.
APPLICATION FILED DEC. 16, 1911.
1,039,711.
Patented Oct. 1, 1912.
2 SHEETS—SHEET 2.
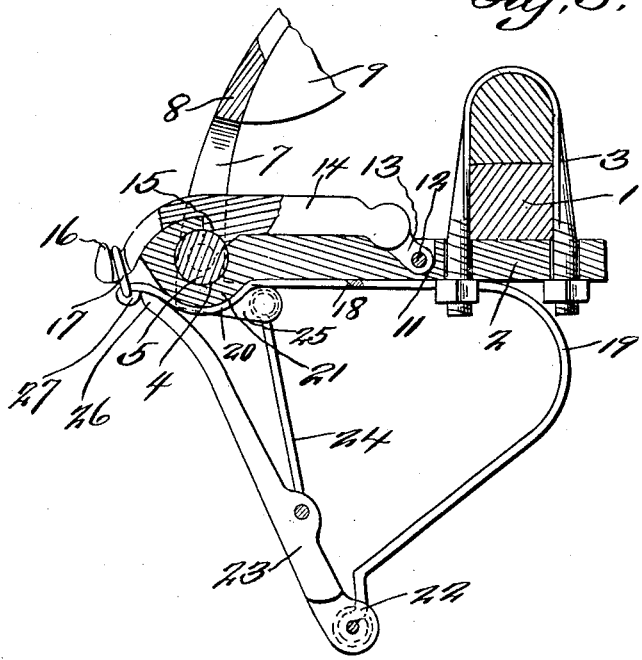
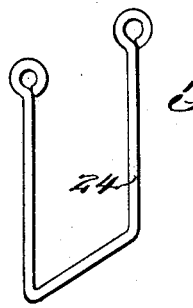
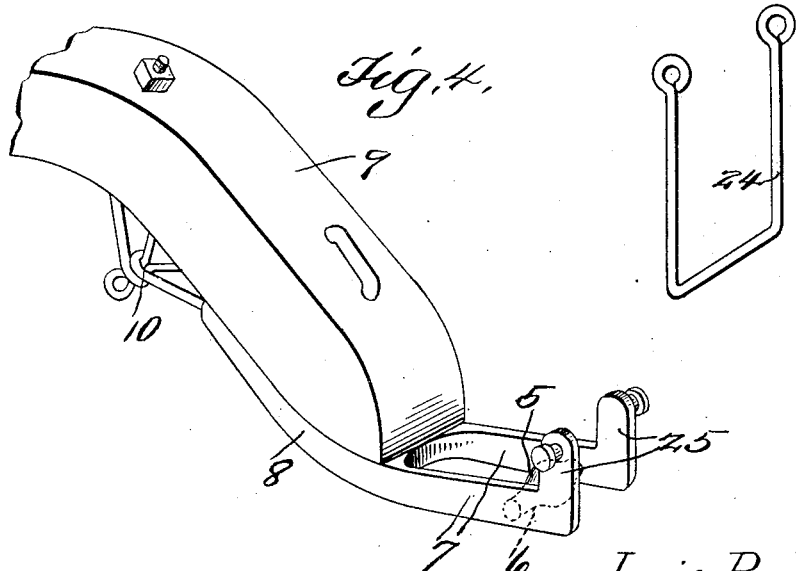
Witnesses
Francis T. Boswell
C. E. Frottingham
Inventor
Irvin B. Duncan,
By D. Swift & Co.
Attorney

UNITED STATES PATENT OFFICE.

IRVIN BELL DUNCAN, OF MACEO, KENTUCKY.

COMBINED SHAFT-SUPPORT AND THILL-COUPLING.

1,039,711.  Specification of Letters Patent.  Patented Oct. 1, 1912.

Application filed December 16, 1911. Serial No. 666,292.

*To all whom it may concern:*

Be it known that I, IRVIN B. DUNCAN, a citizen of the United States, residing at Maceo, in the county of Daviess and State of Kentucky, have invented a new and useful Combination Shaft-Support and Thill-Coupling; and I do hereby declare the following to be a full, clear, and exact description of the invention, such as will enable others skilled in the art to which it appertains to make and use the same.

This invention relates to a new and useful combined shaft support and thill-coupling.

The principal object of the invention is to provide an improved device of this nature having means for resiliently supporting the shaft.

A further object of the invention is the provision of a locking member carried by the resilient means at one end adapted to engage the other and fixed end of the resilient means, for firmly locking the shaft in its supported position.

The invention comprises further features and combination of parts, as hereinafter set forth, shown in the drawings and claimed.

In the drawings: Figure 1 is a view in elevation of the combined shaft support and thill coupling constructed in accordance with the invention. Fig. 2 is a similar view partly in section showing the shaft resiliently supported. Fig. 3 is a view similar to Fig. 2 showing the shaft firmly locked in its supported position. Fig. 4 is a detail view of one end of the shaft, showing a connecting member (which is pivoted to the tie-plate) having the L-shaped ends, to which the locking member is connected by the U-shaped link. Fig. 5 is a detail view of the U-shaped link.

Referring more particularly to the drawings 1 designates an axle, to which is fastened the tie plate 2 by means of the clip 3. This tie plate is provided with a socket 4, in which the enlargement 5 of the pin 6 is arranged. The pin 6 extends transversely between the forks 7 of the member 8, which is bolted or otherwise secured to the shaft 9. The member 8 is also braced relative to the shaft by means of the brace 10, as shown in the drawings. Pivoted in a recess 11 on a pin 12 is the lug 13 of the latch plate 14. To hold the pin 6 and its enlargement in the socket, the latch plate is provided with a lug 15 which bears against the pin 6. The forward end of the latch plate curves partially downwardly over the forward end of the tie plate and terminates in a hooked lip 16, which is engaged by the metal loop 17. Pivoted to the metal loop are the ends of the two leaf springs 18, which are curved upon themselves as at 19. These leaf springs are bulged at 20, to fit an enlargement 21 of the tie-plate, thus helping to hold the springs in place. Pivoted to the ends 22 of the springs is a locking lever 23, which in Fig. 2 is disposed as lying against the leaf springs. The locking lever is held against the leaf springs, as shown in Fig. 2 by means of the U-shaped link 24, the upper ends of which are pivoted to the L-shaped ends 25 to the forks of the member 8. The lower portion of the U-shaped link pivotally connects to the locking lever, beyond its pivot with the springs, as shown in Fig. 2. Upon referring to Fig. 2 it will be seen that, by connecting the link in this manner the shaft 9 will be resiliently supported.

By disposing the locking lever in the position shown in Fig. 3, in which figure the free end 26 of the locking lever is arranged in engagement with the rolls 27 of the springs, so as to firmly lock the shaft in its supported position, the rolls 27 engage the metal loop, which connects with the latch member. When it is desired to remove the shaft 9 disengage the end 26 of the locking lever from the nut 26$^a$, then throw the shaft rearwardly upon its pivot, and bring the locking lever 23 with the pivoted ends 22 of the springs 18 forwardly, which will remove the upper portions of the springs from contact with the plate 2, and especially the bulges 20 from contact with the enlargement 21, after which the metal loop 17 may be slipped over the lip 16. After completing these operations the latch plate 14 may be raised upon its pivot, which will permit the pin 6 with its enlargement 5 to be removed from the socket 4, thereby disconnecting the shaft 9. When disconnecting the shaft 9 the member 8, the link 24, the locking lever 23 and with it the springs 18 including the loop 17 are removed or disconnected simultaneously with the shaft 9.

From the foregoing it will be observed that there has been produced a novel, simple, efficient and practical combination shaft support and thill-coupling.

The invention having been set forth, what is claimed as new and useful is:

1. In combination, a tie-plate, a forked member pivoted thereto and provided with L-shaped ends, a latch member pivoted to the tie-plate and terminating into a hooked lip at its free end, leaf springs connected to the hooked lip and curved upon themselves and disposed beneath the tie-plate, a locking lever pivoted to the free ends of the springs, and a U-shaped link pivoted to the locking lever beyond its pivot with the springs at the lower end, while the upper ends of the U-shaped links are pivoted to the L-shaped ends of the forks, the lever, the springs and the U-shaped link connection constituting means for resiliently supporting the forked member which is adapted to be connected to a shaft.

2. In combination, a tie plate, a forked member pivoted thereto and provided with L-shaped ends, a latch member pivoted to the tie-plate and terminating into a hooked lip at its free end, leaf springs connected to the hooked lip and curved upon themselves and disposed beneath the tie-plate, a locking lever pivoted to the free ends of the springs, and a U-shaped link pivoted to the locking lever beyond the pivot with the springs at the lower end, while the upper ends of the U-shaped links are pivoted to the L-shaped ends of the forks, the lever, the springs and the U-shaped link connection constituting means for resiliently supporting the forked member which is adapted to be connected to a shaft, the locking lever constituting means adapted to be disposed so that its free end may engage the connection of the springs with the hooked lip, to firmly lock the forked member in its supported position.

3. In combination, a tie-plate having a socket a forked member having a pin arranged in the socket and provided with L-shaped ends beyond the pin, the forked member being connected to a shaft, a latch member pivoted to the tie-plate and having a lug to hold the pin in the socket, the latch member having a hooked lip at its free end, and means having connection with the hooked lip including a locking lever having connections with the L-shaped ends for resiliently supporting the shaft in a raised position.

4. In combination, tie-plate having a socket a forked member having a pin arranged in the socket and provided with L-shaped ends beyond the pin, the forked member being connected to a shaft, a latch member pivoted to the tie-plate and having a lug to hold the pin in the socket, and means having connections with the free end of the latch member and including a locking lever having connections with the L-shaped ends for resiliently supporting the shaft in a raised position, the locking lever constituting means adapted to engage the connection between the first means and the latch member for firmly locking the shaft in its supported position.

In testimony whereof I have signed my name to this specification in the presence of two subscribing witnesses.

IRVIN BELL DUNCAN.

Witnesses:
ALLEN DUNCAN,
H. M. LANCASTER.

---

Copies of this patent may be obtained for five cents each, by addressing the "Commissioner of Patents, Washington, D. C."